United States Patent [19]

Hauk et al.

[11] 4,036,261
[45] July 19, 1977

[54] THREAD PROTECTOR FOR OIL-WELL PIPE AND BLADDER INCORPORATED THEREIN

[75] Inventors: Ernest D. Hauk, Signal Hill; Thomas D. Hauk; Kenneth J. Carstensen, both of Huntington Beach, all of Calif.

[73] Assignee: Service Equipment Design Co., Inc., Signal Hill, Calif.

[21] Appl. No.: 600,109

[22] Filed: July 29, 1975

[51] Int. Cl.² .................... F16L 57/00; B65D 59/06
[52] U.S. Cl. ................................. 138/96 T; 138/89
[58] Field of Search ..................... 138/96 T, 93, 89

[56] References Cited

U.S. PATENT DOCUMENTS

| 1,170,439 | 4/1929 | Taylor | 269/329 |
|---|---|---|---|
| 1,498,563 | 6/1924 | Morrison et al. | 179/115 |
| 1,862,858 | 6/1932 | Lyon | 269/160 |
| 2,215,251 | 9/1940 | Prince | 138/96 |
| 2,513,613 | 7/1950 | Baker | 138/96 |
| 2,518,981 | 8/1950 | Edwards | 138/25 |
| 2,523,930 | 9/1950 | Unke | 138/96 |
| 2,547,992 | 4/1951 | Baker | 138/96 |
| 2,559,564 | 7/1951 | Sperling | 220/46 |
| 2,725,898 | 12/1955 | Stansbury | 138/96 |
| 2,729,245 | 1/1956 | Northrop | 138/96 |
| 2,732,864 | 1/1956 | Stansbury | 138/96 |
| 2,745,438 | 5/1956 | Bloom | 138/96 |
| 2,747,617 | 5/1956 | Walden | 138/96 |
| 2,824,579 | 2/1958 | Groh et al. | 138/96 |
| 2,927,609 | 3/1960 | Vander Lans | 138/93 |
| 2,977,993 | 4/1961 | Scherer | 138/96 |
| 2,989,087 | 6/1961 | Higgins | 138/96 T |
| 3,000,402 | 9/1961 | Bowman, Jr. | 138/96 T |
| 3,450,163 | 6/1969 | Mercier et al. | 138/30 |
| 3,485,271 | 12/1969 | Halsey | 138/96 T |
| 3,572,389 | 3/1971 | Wietand | 138/30 |
| 3,719,984 | 3/1973 | Frishof | 29/482 |
| 3,858,613 | 1/1975 | Muzzlewhite | 138/96 T |
| Re. 18,184 | 9/1931 | Brown et al. | 138/96 |

FOREIGN PATENT DOCUMENTS 664,372  8/1938  Germany ................... 138/96

OTHER PUBLICATIONS

(Advertisement sheet), "Quick-E" Air-Type Thread Protector, B. J. Stansbury, Inc., Bakersfield, Calif.
(Advertisement sheet), "Quick-E" Hydraulic Thread Protector, B. J. Stansbury, Inc., Bakersfield, Calif.
(Advertisement sheet), "Sphere" Mechanical Thread Protector, Sphere Development Ltd, of Edmonton, Alberta, Canada.

Primary Examiner—Henry K. Artis
Attorney, Agent, or Firm—Richard L. Gausewitz

[57] ABSTRACT

A pneumatically-operated thread protector for casing pipe, etc., has a thick rubber bladder which extends on (a) the outside, (b) the inside, and (c) the extreme end of the pipe, such bladder being generally U-sectioned or hairpin-sectioned. Provided around and within the bladder is a shock-resistant and wear-resistant metal housing which is also U-sectioned or hairpin-sectioned generally correspondingly to the bladder. Means are provided to seal the lips of the bladder to the housing, and to prevent the housing from shifting off the inflated bladder, in such manner as to permit substitution of new bladders yet to (a) maintain effective air seals, and (b) maintain the parts in assembled condition despite the effects of tremendous loads and shocks. Means are provided to inflate the bladder so that it will grip or grasp tightly the exterior and interior cylindrical surfaces of the pipe end, thus minimizing the possibility of accidental demounting of the protector from the pipe. The air further creates self-centering and shock-resistant actions, and strengthens from within the relatively lightweight and dentable shell portion of the housing — such shell being formed of spun sheet steel.

38 Claims, 10 Drawing Figures

THREAD PROTECTOR FOR OIL-WELL PIPE AND BLADDER INCORPORATED THEREIN

BACKGROUND OF THE INVENTION:

1. Field of the Invention

This invention relates to the field of fluid-operated protectors for pipe threads, particularly in the oil-well industry.

2. Description of the Prior Art

Great shock loads are often created when the ends of oil-well pipe sections are dragged or slid to positions adjacent the well into which they are to be introduced. Furthermore, there frequently are enormous shocks when pipe sections are dragged or slid away from the well. In the absence of effective protection for the threads on the pipe sections, such shocks would often damage the threads and make the pipe unusable.

The shock loads are directed radially of the pipe, or longitudinally thereof, or a combination of the two. As an example of a longitudinal shock, a pipe may be so dropped or slid that it moves axially until its end crashes against a relatively hard surface.

When a pipe section is dragged, there are created powerful forces tending to rip the protector off the pipe end. These forces may occur, for example, when the pipe end reaches the transition point between a horizontal supporting surface and an inclined ramp. Unless the protector can withstand such forces, the pipe end will become exposed to damage as it is dragged or slid the remaining distance to the desired position.

Not only must the protector resist shocks, but it must be relatively immune to the great amount of wear which results from the dragging. In addition, the protector must be easy to mount and demount in a few seconds, must not be excessively heavy, and must be relatively universal in its operation.

Relative to the latter factor, universality, it is emphasized that "7-inch" (for example) pipe normally has the same outer diameter but may have distinctly different inner diameters, the inner diameters varying in accordance with pipe thickness and weight. A "7-inch" (for example) thread protector should be so universal as to fit on most seven-inch pipes, regardless of wall thickness and (very importantly) regardless of the type or class of thread which is present. There are various types or classes of threads, and it would be undesirable if each thread type made it necessary to use a different thread protector.

The optimum threadprotector should also be relatively easy to manufacture, and to repair in the field. Pneumatic-type thread protectors should also be such that they will not leak even when subjected to extreme shocks, but will leak (instead of exploding) if air is inadvertently introduced prior to mounting on the pipe ends.

The prior art has not, despite thread-protector development over several decades, produced a thread protector which adequately satisfies all or even most of the above criteria.

SUMMARY OF THE INVENTION:

The present thread protector incorporates a thick rubber bladder which extends around the exterior of the pipe end portion and also turns inwardly at the extreme pipe end, the result of such turning being that a part of the bladder is in axial alignment with the extreme pipe end and serves as a cushion and shock absorber therefor. A shock and wear-resistant housing is provided around the bladder and in axially spaced relationship from the pipe end, thus protecting the bladder and cooperating therewith to absorb the shock forces.

Means are provided to seal to the housing the edges or lips of the bladder, in such manner that the bladder may be inflated to grip the pipe and also to provide an air-pressure backup for the housing. Such sealing means operate additionally to retain the housing in assembled relationship on the bladder and thus on the pipe.

The first such sealing and retaining means is adjacent the outer pipe surface, being a generally frustoconical seal wall formed on a nose portion incorporated in the housing. The seal wall converges toward the center of the pipe end and maintains the air seal -- relative to the outer edge or lip of the bladder — despite the presence of extreme axial loads. Such bladder lip is beveled and has a sealing bed thereon. The second such sealing and retaining means comprises, adjacent the inner pipe surface, an unstretchable ring which cooperates with the inner bladder lip or edge in maintaining an air seal relative to an interior housing portion. The ring is preferably steel, and is molded into the bladder. An O-ring is provided between the housing and the inner bladder lip, and a snap ring or its equivalent is provided to prevent disassembly.

In the greatly preferred form of the thread protector, the inner portion of the bladder extends axially of the pipe for a substantial distance away from the extreme pipe end. Such inner portion, when inflated, grips tightly against the inner pipe surface to augment the forces holding the protector on the pipe, and to augment the self-centering and shock-resisting effects. Such gripping or grasping occurs despite considerable variations in the inner diameter of the pipe. The forces holding the present protector on the pipe are astoundingly high.

The housing of the protector primarily comprises relatively thin sheet steel which can be somewhat dented, in response to tremendous blows, but will not fracture or shatter. The thin steel is formed by spinning, and is backed up by the high-pressure air and the rubber contained within.

There are provided, in the bladder portions relatively adjacent the extreme pipe end, seal preload means and air-passage means to assure the desired sealing and air-flow actions. Air is introduced and withdrawn from the inner portion of the housing, through a valve-containing cross tube.

In one form of the invention, a shock and wear-resistant lamination is provided within the bladder, to prevent its damage by the pipe end and to create addition cushioning.

The end result is that the pipe end is cushioned all around by rubber, compressed air and metal, in a unique shock-absorbing manner that create surprisingly effective results long needed by the oil-well industry.

DETAILED DESCRIPTION OF THE PREFERRED EMBODIMENTS:

Throughout this specification and claims, the word "rubber" denotes any natural or synthetic rubber, or other elastomeric (or plastic) material having the general characteristics of rubber.

The thread protector incorporates a rubber bladder 10 having a generally cylindrical outer portion 11 which is sized to fit loosely (prior to inflation) about the exterior of the threaded end portion 12 of a pipe 13, for example a casing pipe for an oil well. Bladder 10 also has a base portion 13 which extends radially-inwardly so as to be in axial alignment with the extreme end 16 (FIG. 3) of pipe 13.

Connected to the base portion 14 of the bladder is a generally cylindrical inner bladder portion 17, such portion extending axially of the pipe and generally concentrically of outer portion 11 whereby an annulus 18 (FIG. 2) is defined between the outer and inner bladder portions. The outer diameter of inner portion 17 is sufficiently small, and the inner diameter of the outer bladder portion 11 sufficiently large, that the annulus 18 may readily receive pipe end portion 12 (prior to bladder inflation) regardless of the wall thickness of the latter (within the conventional range of pipe thicknesses). Thus, any conventional threaded pipe end employed in the oil-well industry, and having a nominal outer diameter of (for example) seven inches, will fit easily into the annulus 18 of a seven-inch thread protector regardless of the type or class of threads and regardless of wall thickness. Accordingly, only one type of protector need be stocked for each seven-inch pipe, one for each four-inch pipe, etc.

Figures 1, 4, 9:
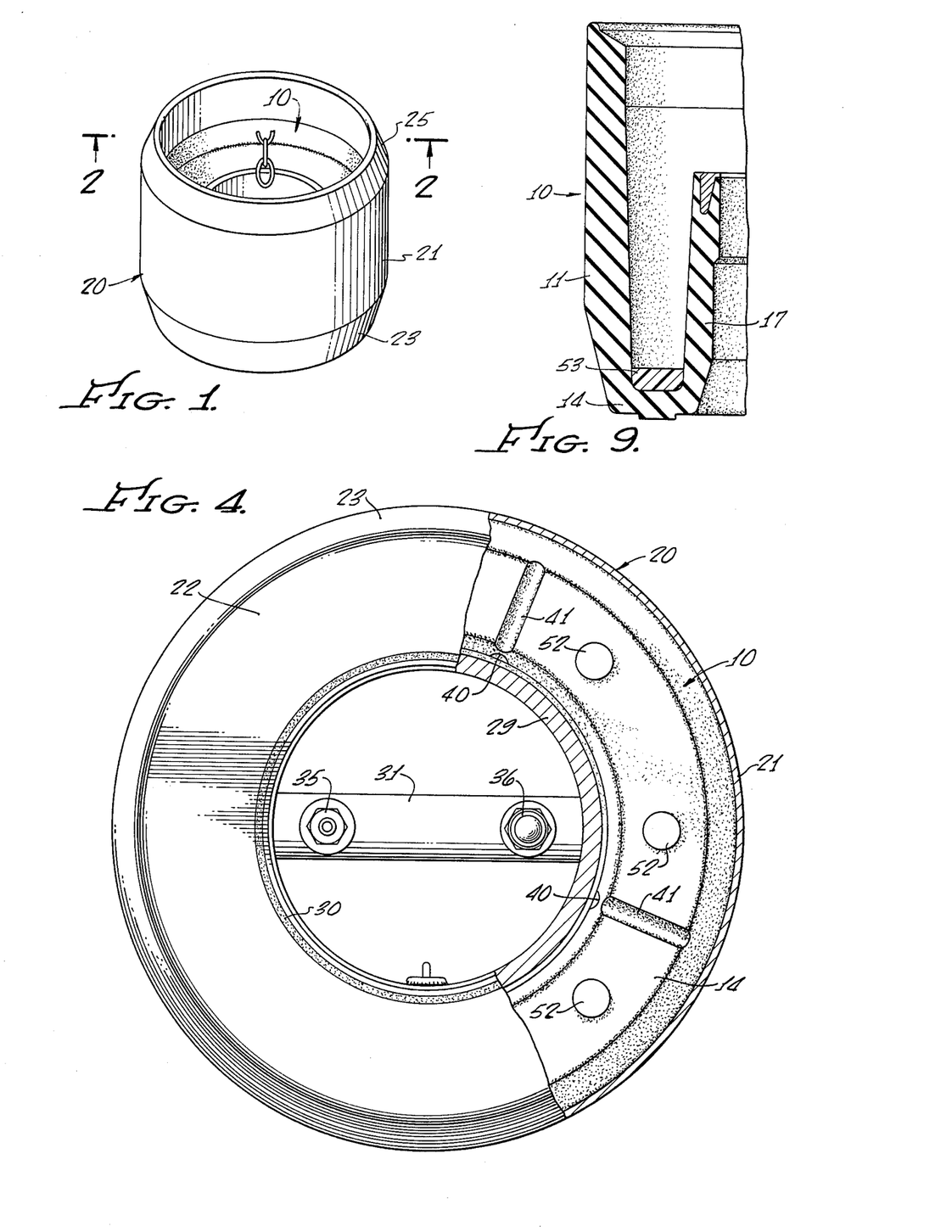
FIG. 1 is an isometric view of the thread protector.
FIG. 4 is a bottom plan view of the protector, with portions broken away to illustrate the lower or base end of the bladder.
FIG. 9 is a fragmentary vertical sectional view illustrating a lamination or insert in the corner or base region of the bladder, providing additional cushioning and protection against wear and damage resulting from great axial loads and shocks.
Figure 2:
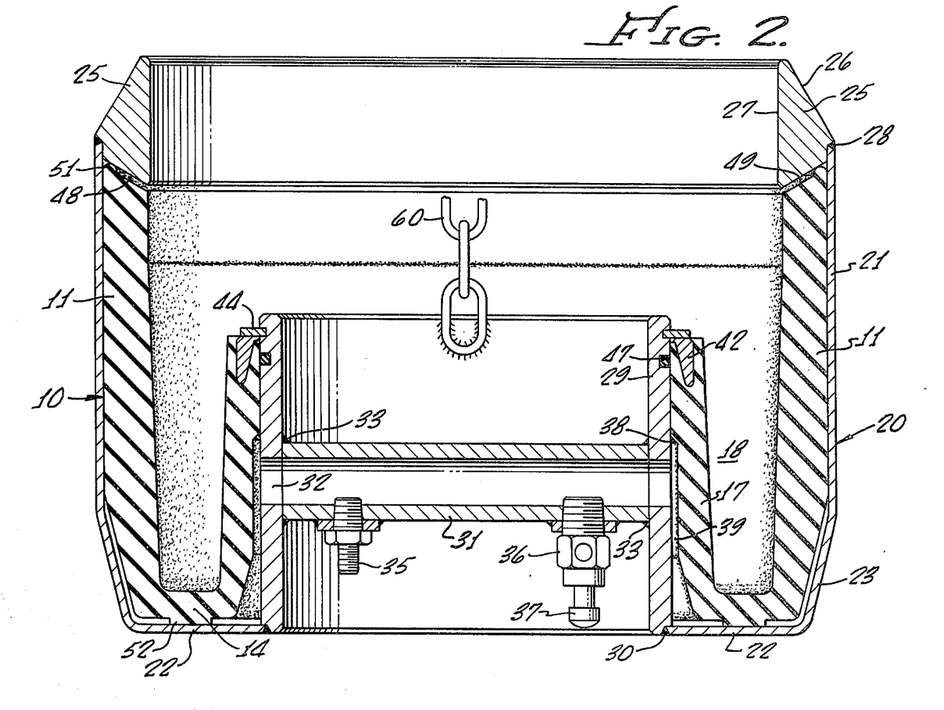
FIG. 2 is a vertical central sectional view taken on line 2—2 of FIG. 1, showing the thread protector in its uninflated condition and prior to introduction of a pipe end portion therein.

The above-described relationships between the outer and inner portions of the bladder cause the cross-section thereof (at each side of the protector) to be generally U-shaped or hairpin-shaped as best shown in FIGS. 2 and 9. In the illustrated embodiment, the outer bladder portion 11 extends upwardly much farther than does inner portion 17.

In the present apparatus, there is no need to make each bladder portion (or any bladder portion) 11, 14 or 17 hollow. This means that there are simplicities and economies of manufacture, and improved wearing and pipe-gripping capabilities for a bladder of given size.

Each bladder portion is sufficiently thick to provide effective shock-absorbing and pipe-gripping functions. Thus, the bladder may be referred to as "thick-walled". Each bladder portion should be at least about ¼ inch thick, and is preferably in the thickness range of 7/16 inch to ⅝ inch. A preferred bladder material is neoprene, having a Shore hardness (durometer) of 65–70. Some Buna-N may be incorporated in the neoprene.

It is pointed out that words such as "bladder," "bladder means," etc., are used in the present specification and claims despite the fact that-as mentioned above-no bladder portion need be hollow. Each "bladder portion" of the embodiments shown in the drawings and described in detail in the present specification is actually a rubber wall or membrane which cooperates with the opposed metal elements to define a chamber or chambers for air or other fluid. The seal means for preventing escape of fluid from the chamber or chambers defined by the metal walls and by the opposed rubber "bladder" walls are described subsequently.

Provided around the outer portion 11 and base portion 14 of bladder 10 is a shock-resistant and wear-resistant metal shell 20. Such shell has a generally cylindrical outer portion 21 which fits around the outer bladder portion 11 when the bladder is in undeflected condition as shown in FIG. 2. The shell 20 further has a radially-inwardly extending end or base portion 22 which extends beneath the bladder base 14. Preferably, a beveled region 23 between the base 22 and outer portion 21 is provided and tends to facilitate the dragging or the protector along a ramp or the like.

The shell 20 is formed of relatively thin and lightweight sheet metal which can be bent or dented in response to particularly heavy blows but is not readily deformed. Since the shell may thus bend, the presence of a very heavy blow or shock will not damage the pipe or the entire protector but will merely form a dent in the shell. Such dents are normally small and do not interfere with the operation of the apparatus.

The shell 20 is resiliently backed-up and reinforced by the air pressure and rubber in the thread protector, therefore acting somewhat as a ballon and/or as a pneumatic shock absorber.

As a specific example of a presently-preferred shell 20, it is preferably composed of sheet steel which has been formed by metal-spinning to the indicated shape. It has a wall thickness of about ⅛ inch, and is preferably made of A.I.S.I. 4130 steel which has been heat-treated to 42-44 hardness on the Rockwell C Scale.

Figure 8:
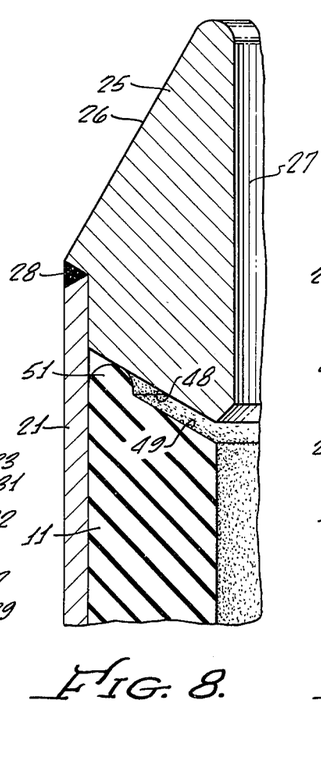
FIG. 8 is a greatly enlarged fragmentary vertical sectional view corresponding to an upper and outer portion of FIG. 2, illustrating in uninflated condition the sealing and retaining means for the outer lip or edge of the bladder.

The shell 20 forms part of the overall housing of the protector, being joined at the upper edge of portion 21 to a nose ring 25 formed of steel. The ring 25 has a beveled outer surface 26 which converges in a direction away from the end of the pipe, and tends to prevent catching of the thread protector on obstructions along the path over which it is dragged (one such obstruction being the intersection between level and inclined portions of such path). Ring 25 has an interior cylindrical surface 27 the diameter of which is sufficiently larger than that of the pipe end portion 12 to facilitate mounting of the thread protector thereon. Such surface 27 has a diameter somewhat smaller than that of the interior surface of outer bladder portion 11 when the latter is in uninflated condition as shown in FIGS. 2 and 8, thus facilitating mounting of the protector on the pipe. The nose ring 25 is securely fastened to shell 20, in air-tight relationship, by a circumferential weld indicated at 28.

The remaining surface of nose ring 25 is shaped in a certain manner to form part of the sealing and retaining means described in detail below.

In addition to the shell 20 and nose ring 25, the housing of the thread protector comprises an inner or core portion 29. Such inner portion 29 is illustrated as being a hollow metal cylinder which is circumferentially and sealingly welded at 30 to the inner edge of the shell base 22. The lower end of the cylinder 29 is flush with base 22, whereas the upper end is beveled and is somewhat above (FIGS. 2, 3 and 7) the lip of inner bladder portion 17.

Core cylinder 29 is concentric (coaxial) with shell wall 20, but has a much smaller diameter. The radial space therebetween is substantially larger than what is needed to receive both bladder portions 11 and 17 as well as pipe end 12.

The core cylinder forms part of the means for passing air into and out of the thread protector, it being understood that gases other than air may be employed and furthermore (but much less preferably) that liquids under pressure may be employed. To introduce and withdraw air from the thread protector, a cylindrical pipe 31 is welded across the interior of cylinder 29, in registry with openings 32 therein. This is effected by means of welds 33, such welds being (like the other welds 28 and 30 described above) completely leakproof.

Inlet and exhaust valves 35 and 36, respectively, are mounted on pipe 31. The pipe is recessed sufficiently far into the protector that neither valve is exposed to damage or accidental operation when the protector is dropped or dragged. The valve 35 is threaded into a washer which is welded to the pipe in sealing relationship, and may be a conventional type of checkvalve in the nature of a tire valve or a tank valve. Exhaust valve 36 is also threaded into a washer which is welded to pipe 31 in sealing relationship, being a manually-operated valve which releases air in response to pressing of a button 37.

Referring to FIG. 2, it is pointed out that a shoulder 38 is provided on the inner side of inner bladder portion 17, at a region above the ports 32, whereby the portions of the inner bladder adjacent such ports are spaced therefrom in order to provide air paths to the bottom of the apparatus when air is introduced through inlet valve 35. Stated otherwise, a small annulus 39 (FIG. 2) is present between core cylinder 29 and bladder portion 17, such annulus extending downwardly to the vicinity of bladder base 14. To further assure that air flow paths will be present in both directions (inflation and exhaust), grooves 40 are formed axially in the inner surface of bladder portion 17 (FIGS. 4 and 5).

The outer surface of outer bladder portion 17 at regions adjacent the beveled end 23 of the shell, and the inner surface of inner bladder wall 17 at lower regions thereof below annulus 39, are inclined and spaced away from the adjacent metal (FIG. 2) to thereby provide air paths through which air may flow from the annulus 39 to both the outer and inner surfaces of the bladder. To insure that air flow may always occur beneath bladder base 14, both during introduction of air and during venting thereof when button 37 is pressed, radial grooves 41 (FIGS. 4 and 5) are provided in the lower surface of the bladder base 14.

Figures 5, 7:
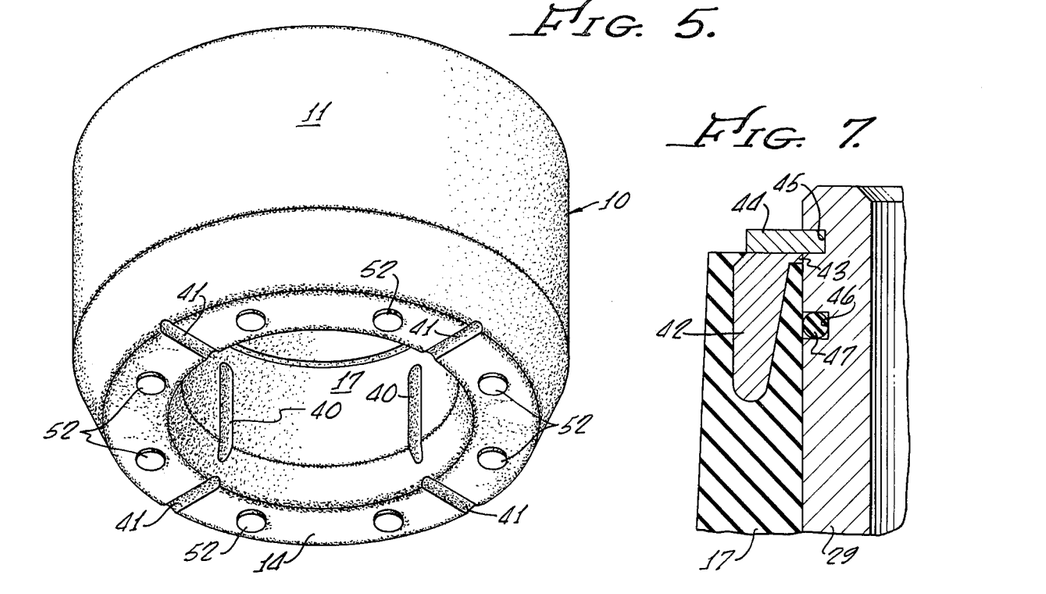
FIG. 5 is an isometric view illustrating the bladder alone, in uninflated condition.
FIG. 7 is a greatly enlarged fragmentary vertical sectional view corresponding to a central region of FIG. 2, illustrating the sealing and retaining means for the inner lip or edge of the bladder.

Referring particularly to FIG. 7, there will next be described the means for maintaining a seal between core cylinder 29 and the inner (upper) edge or lip of inner bladder portion 17, and also for maintaining the housing in assembled relationship with the bladder.

The bladder 10, all portions of which are preferably molded in a unitary or integral relationship, has embedded in its inner edge during the molding process an unstretchable or inelastic ring 42 which is preferably formed of steel. Ring 42 extends around the full circumference of the edge or lip region of the inner bladder portion. The illustrated ring 42 is somewhat frustoconical in cross-sectional shape, having surfaces which converge in a downward direction (toward the end of the pipe).

Figure 3:
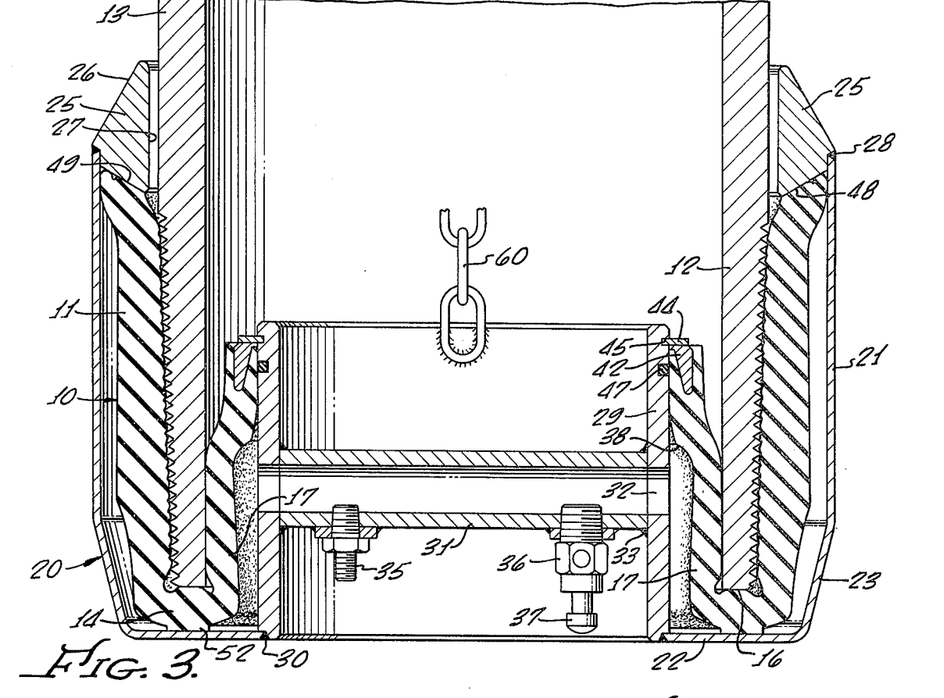
FIG. 3 is a view corresponding to FIG. 2 but illustrating the apparatus after introduction of a pipe end and after inflation of the bladder to cause it to grip both the exterior and the interior of the pipe.

At its upper region, ring 42 has a radially-inwardly extending flange 43 (FIG. 7) which fits closely around the outer cylindrical surface of core cylinder 29. Furthermore, the interior cylindrical surface of the lip region is sized to fit closely around such exterior surface of the core cylinder. Thus, when the bladder is in mounted relationship as shown in FIGS. 2, 3 and 7, the bladder edge or lip region does not expand in response to the air pressure but instead remains fixed and rigid.

The inner edge region, and thus the bladder portion 17, are prevented from sliding off the core cylinder 29 by means of a snap ring 44 which is caused to seat in a circumferential exterior groove 45 (FIG. 7) after the mounting of the bladder in its housing.

At a position radially inwardly of ring 42, and spaced below ring 44, the core cylinder 29 is annularly grooved at 46 (FIG. 7) to receive an O-ring 47 which maintains an air seal insuring that there will be no leakage between the lip and the core cylinder. The O-ring, the ring 42, the flange 43 and the rubber of the bladder cooperate to prevent air leakage despite considerable pressures (such as 100 psi and higher) within the bladder. The seal is maintained even if the ring 42 moves somewhat away from snap ring 44.

In the described manner, therefore, the inner region of the bladder is effectively secured to core cylinder 29 and sealed relative thereto, while permitting mounting and demounting of different bladders 10 as desired.

Figure 8A:
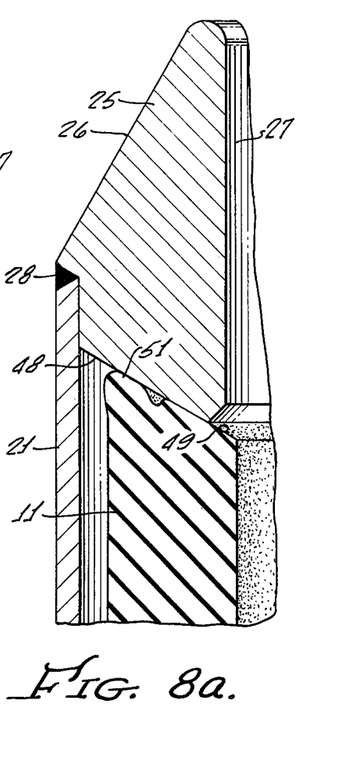
FIG. 8a is a view corresponding to FIG. 8, but showing the sealing relationship which occurs after inflation and after downward axial loads have slid the sealing region to a different position from that illustrated in FIG. 8.

Referring next to FIGS. 8 and 8a, there are shown the sealing and retaining regions between the nose ring 25 and the upper lip or rim of outer bladder portion 11. The nose ring 25 has a generally frustoconical or tapered lower surface 48 which converges downwardly, namely toward the center of the lower end of the thread protector and the pipe. The angle of downward inclination may be, for example, approximately 30° relative to a horizontal plane. The upper edge of bladder portion 11 is generally correspondingly tapered, at a surface 49 which also converges downwardly toward the center of the end of the pipe. Furthermore, there is provided at the extreme upper and outer edge of bladder portion 11 a sealing lip 51 adapted to be forced into pressure engagement with surface 48 in response to the pneumatic pressure within shell 20.

Referring to FIGS. 2 and 8, the lip 51 is initially in engagement with surface 48 at the upper region thereof. Thus, the lip 51, the O-ring 47 and associated parts effect initial seals relative to the spaces between the bladder and its housing. Stated otherwise, there are provided sealed chambers between inner bladder portion 17 and the outer surface of core cylinder 29, and also between shell 20 and the outer surfaces of bladder portions 11 and 14.

The initial seal at the outer rim of the bladder is augmented due to axial pressure resulting from the presence on the bottom of base 14 of a plurality of circumferentially-spaced integral cylinders or buttons 52 (FIGS. 4 and 5) which bias the bead 51 against surface 48. Stated otherwise, the vertical dimensions of cylinders 52 are such that, after the outer portion 11 of the bladder is inserted or "popped" into the mounted condition shown in FIG. 2, there will be axial pressure present and forcing the bead 51 into engagement with surface 48. The protuberances 52 further cooperate with the grooves 41 (FIG. 4) in providing air-flow paths beneath the base portion 14 of the bladder.

Protuberances 52 not only provide the stated seal preload in an economical manner but are such as to facilitate mounting of the bladder in the housing.

Upon introduction of air into the above-described chambers from inlet valve 35, the outer bladder portion 11 is forced radially-inwardly into pressure engagement with the external threads of pipe end portion 12, at all regions except adjacent the nose ring 25 as illustrated. In this connection, it is pointed out that, since the inner diameter of bladder portion 11 is not greatly larger than the outer diameter of pipe end 12, the amount of radial-inward movement of the bladder portion 11 in response to pressurization of the apparatus is not extreme. Thus, such inner movement of portion 11 does not tend to pull excessively on the upper edge or lip of bladder portion 11.

In contrast to the situation relative to the outer bladder portion 11, the radial-outward movement of the lower region of inner bladder portion 17 may be relatively great, especially where the pipe end 12 has a relatively thin wall as is the case with lightweight pipe. However, despite such relatively great radial-outward movement of inner bladder portion 17, the seal is maintained at O-ring 47 since the inelastic ring 42 does not permit the upper end or lip region of the bladder to move radially-outwardly.

Figure 6:
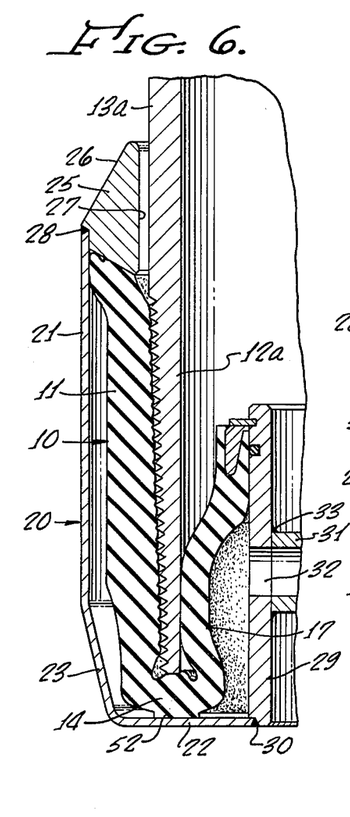
FIG. 6 is a fragmentary vertical sectional view corresponding generally to the left portion of FIG. 3, and illustrating the application of the protector to a pipe end having a smaller wall thickness and therefore a larger inner diameter.

For an illustration of relatively thin-walled pipe, wherein the lower region of the inner portion 17 moves a relatively great distance outwardly, reference is made to FIG. 6. The pipe in FIG. 6 is numbered 12a, and the threaded end 13a.

It will thus be seen that the end of the pipe is grasped on both sides by the bladder, in a very tight engagement caused by the air pressure -- which pressure may be, for example, 100 psi. The bladder thus grips or grasps the pipe end in very firm relationship. Furthermore, the snap ring 44 and the nose ring 25 cooperate in preventing the housing of the thread protector from moving downwardly relative to the bladder. Thus, the entire thread protector is extremely firmly maintained on the pipe end. The amount of tension required to pull the protector off the pipe end is enormous, which is an important factor preventing accidental displacement of the protector relative to the pipe end as the protector is dragged along a path.

It is pointed out that the tapered seal surface 48 creates a wedging action relative to the bladder lip, maximizing the effect whereby the housing may not move off the pressurized bladder.

In the event the pipe is shifted axially until the base portion 22 of the housing strikes a stop surface, there is an effective cushioning and shock-absorbing action relative to the extreme end 16 of the pipe - preventing damage to such end. This shock-absorbing action is caused by the shell wall 22, by base portion 14 of the bladder, by cylinders 52, and by the air within the apparatus. The high-pressure air and the rubber cooperate to back-up the wall 22 in a resilient manner.

To provide an additional shock-absorbing action, and to minimize wear and damage to the bladder in response to extreme axial shocks and loads, a lamination or insert may be provided upwardly adjacent the bladder base as shown at 53 in FIG. 9. The insert is press-fit in the annulus between bladder portions 11 and 17, adjacent the upper side of portion 14. The lamination or insert, which is preferably formed of polyurethane, is thus interposed between the pipe end surface 16 and the base portion 14 to increase the cushioning and wear-resistant actions. The polyurethane is resilient, having a preferred Shore hardness (durometer) of 85-90.

When there is an extreme axial load on the pipe (upward load on the protector), the sealing bead 51 (FIG. 8a) tends to be pulled downwardly. This is due to the fact that the outer portion 11 of the bladder is in tight frictional and interlocking engagement with the pipe end and with its threads, and therefore moves downwardly with the pipe during the loading. Despite such downward movement, there is no loss of seal since the bead 51 moves down the inclined sealing surface 48 and maintains its seal therewith.

It is also to be noted that any downward movement of the insert or embedded ring 42 relative to snap ring 44 does not prevent loss of seal, since the O-ring 47 maintains its seal relative to the bladder.

Shock loading of the thread protector in axial, radial, and combined directions is resisted by the pneumatic shock-absorbing action of the apparatus, caused by the interaction between the thick rubber bladder 10, the air pressure within the described chambers, and the shell 20 which (as above noted), is of a bendable type adapted to be dented instead of broken in response to extreme blows. The result of these actions is thorough protection of all end portions of the pipe, not only at the outer surface but at the end surface and even the inner surface.

The pneumatic forces within the thread protector, and the bias forces created by the thick rubber bladder 10, cause the thread protector to be self-centering relative to the pipe end 12 so that the coaxial condition shown in FIG. 3 is substantially instantly resumed after cessation of radial loading. Thus, shifting of the protector away from the illustrated concentric relationship of FIG. 3 continues only during minimum amounts of time.

Referring to FIG. 2, it is to be noted that the accidental pressurizing of the thread protector when there is no pipe end present in annulus 18 does not produce any tendency to create an explosion. This is because the upper end of the bladder portion 12 merely pops radially-inwardly to release the air before any extreme pressure has been able to build up. On the other hand, when a pipe end 12 is present in the annulus, the described extreme gripping forces occur substantially immediately in response to introduction of air through the inlet valve 35.

After the thread-protection action is no longer needed, the apparatus is readily and quickly released from the pipe end by merely pressing on the button 37 to vent the air to the atmosphere. The thread protector then drops off the pipe end and may be shifted back to any desired point. This may be done, for example, by means of a chain 60 which may be associated with an inclined wire along which the thread protector may move when not in use. Such chain may be welded, for example, to the inner surface of core cylinder 29 as illustrated.

In the event a bladder 10 wears out, it is readily replaced by removing the snap ring 44, and cutting (if necessary) the bladder into sections. A new bladder is then mounted by inserting the inner portion 17 around the core cylinder 29, mounting snap ring 44 in position, and popping the upper edge of outer portion 11 beneath the nose ring 25.

It is emphasized that the present thread protector is circumferentially continuous, having no weak spots or gaps to reduce the strength thereof.

Although the protector has been described relative to a pipe end having exterior threads, the same or a similar protector may be employed relative to pipe having interior threads in that the inner portion 17 of the bladder shifts outwardly into engagement with the inner pipe surface as illustrated in FIGS. 3 and 6.

Because of the presence of the grooves and buttons 40, 41 and 52, and because of the described spaces and recesses permitting air flow, there is no danger that air will be trapped in the apparatus (not vented) when button 37 of the release valve is pressed.

The inner surface of bladder portion 11 may, if desired, be annularly grooved in parallel horizontal planes, the grooves receiving various ones of the pipe threads.

For economy of production, and for improved bond to the rubber, ring 42 may be replaced by a solid (not hollow) steel ring having a circular cross-sectional shape.

To prevent rusting and corrosion of surface 48, a bead may be provided at the lower corner of nose ring 25, at the intersection of surfaces 27 and 48. Such bead is rounded, and engages surface 49-thus preventing ingress of water and air.

The foregoing detailed description is to be clearly understood as given by way of illustration and example only, the spirit and scope of this invention being limited solely by the appended claims.

We claim:

1. A fluid operated thread protector for the threaded end of a pipe section, which comprises:
    a. housing means having a first portion sized to be mounted around the exterior of the threaded end of a pipe section,
        said housing means also having a second portion sized to be mounted within the interior of said threaded end,
    b. bladder means having a first portion mounted within said first portion of said housing means and exterior to said threaded end,
        said bladder means also having a second portion mounted around said portion of said housing means, being interposed between said threaded end and said second portion of said housing means,
    c. means to create greatly increased fluid pressures within said housing means and thereby effect fluid shifting of at least part of said first portion of said bladder means radially inwardly into tight gripping relationship to the exterior of said threaded end, and also effect fluid shifting at at least part of said second portion of said bladder means radially outwardly into tight gripping relationship to the interior of said threaded end,
        whereby said threaded end is tightly gripped in response to fluid forces and on both the exterior and interior thereof,
    d. means to prevent said housing means from shifting off said bladder means,
        whereby said housing means is prevented from shifting off said threaded end despite loads and shocks received by said housing means during movement of said pipe section, and
    e. means to prevent unintentional loss of the fluid pressure maintaining in said shifted positions said first and second portions of said bladder means.

2. A fluid operated thread protector for the threaded end of a pipe section, which comprises:
    a. a metal housing,
        said housing being adapted to be mounted around the threaded end of a pipe section, at least a major portion of said housing being relatively thin-walled sheet metal which is adapted to be dented, in response to unusually severe shocks, instead of fracturing,
        said major portion including the housing portion nearest the extreme end of said pipe section,
    b. bladder means mounted within said housing and adapted, in response to increased fluid pressure, to maintain said housing positioned on said threaded end,
        at least a substantial portion of said bladder means being exterior to said pipe end and interior to said sheet metal,
    c. means to pass fluid into said housing to increase the fluid pressure exerted on said bladder means, and
    d. means to maintain said increased fluid pressure to thus maintain the thread protector on said threaded end.

3. The invention as claimed in claim 2, in which said major portion of said housing is sheet steel which has been formed into shape by metal spinning.

4. The invention as claimed in claim 2, in which said sheet steel has a wall thickness of about ⅛ inch.

5. A fluid-operated thread protector for the threaded end portion of a pipe section, which comprises:
    a. a metal housing adapted to be mounted around the threaded end portion of a pipe section,
        said housing having an inwardly-extending end portion a region of which is in axial alignment with the extreme end of said pipe section,
    b. a bladder having one portion mounted around said threaded end portion in interposed relationship between said housing and said threaded end portion,
        said bladder also having another portion interposed between said extreme end and said inwardly-extending end portion of said housing,
    c. means to pass fluid under pressure into chamber means located between said housing and said bladder to thus cause at least large parts of said bladder to press against and grip said threaded end portion, and
    d. means to prevent loss of the resulting fluid pressure,
        said metal housing, said bladder and said fluid pressure mutually cooperating to cushion effectively said threaded end portion against both axial and radial shocks and blows.

6. The invention as claimed in claim 5, in which said bladder is thick-walled and is formed of rubber.

7. The invention as claimed in claim 6, in which at least a major portion of said housing is formed of sheet steel adapted to bend in response to particularly severe blows.

8. The invention as claimed in claim 5, in which an insert is interposed between said extreme end of said pipe section and said other bladder portion, to aid in the cushioning action and to minimize wear on said bladder.

9. A fluid operated thread protector for the threaded end portion of a pipe section, which comprises:
   a. a housing,
      said housing having an outer portion shaped to be mounted around the threaded end portion of a pipe section in radially-outwardly spaced coaxial relationship relative thereto, said housing also having a base portion extending radially-inwardly from said outer housing portion,
      a region of said base housing portion being in alignment with the extreme end of said pipe section,
   b. a bladder,
      said bladder having an outer portion interposed between said outer housing portion and said threaded end portion, said bladder also having a base portion extending radially-inwardly from said outer bladder portion and interposed between said base housing portion and said extreme end of said pipe section,
   c. means to create effective seals between said housing and two edge regions of said bladder,
      one of said seals being between said outer housing portion and said outer bladder portion,
         said one seal being radially-outward of said threaded end portion and spaced a substantial distance away from said extreme end of said pipe section, the other of said seals being located closer to the axis of said housing and of said bladder than is said extreme end of said pipe section,
      whereby a sealed chamber is defined between said outer housing portion and said outer bladder portion, and between said base housing portion and said base bladder portion,
   d. means to pass fluid under pressure into said chamber, to thus exert pressure on said outer bladder portion and force the same radially-inwardly into tight gripping relationship to said threaded end portion, and
   e. means to prevent said housing from shifting off of said bladder whereby said gripping of said threaded end portion by said bladder causes said housing to remain on said threaded end portion.

10. The invention as claimed in claim 9, in which said outer bladder portion and said base bladder portion are formed of relatively thick rubber and are not hollow.

11. The invention as claimed in claim 10, in which said one seal is effected between a lip of said outer bladder portion and a region of said housing which converges toward the center of said extreme end of said pipe section, whereby to prevent loss of seal in response to axial loads on the thread protector.

12. The invention as claimed in claim 10, in which said other seal is effected between an inner lip of said bladder and a portion of said housing which is located within said pipe section, and in which means are provided to prevent an increase in the diameter of said inner lip.

13. The invention as claimed in claim 10, in which said one seal is effected between a lip of said outer bladder portion and a region of said housing which converges toward the center of said extreme end of said pipe section, whereby to prevent loss of seal in response to axial loads on the thread protector, and in which said other seal is effected between an inner lip of said bladder and a portion of said housing which is located within said pipe section, said inner lip having molded therein a ring preventing an increase in the diameter of said inner lip.

14. The invention as claimed in claim 10, in which said housing is formed primarily of relatively thin-walled spun sheet steel, said steel being adapted to bend in response to extreme blows, said steel, said rubber and the pressure in said chamber cooperating to effect a cushioning action relative to said threaded end portion of said pipe section.

15. The invention as claimed in claim 10, in which said one seal is effected between a lip of said outer bladder portion and a sealing surface of said housing, in which said other seal is effected between an inner lip of said bladder and a portion of said housing which has a smaller diameter than that of said threaded end of said pipe section, and in which said housing is formed primarily of relatively thin-wall spun sheet steel, said steel being adapted to bend in resonse to extreme blows, said steel, said rubber and the fluid pressure in said chamber cooperating to effect a cushioning action relative to said threaded end of said pipe section.

16. A fluid operated thread protector for the threaded end of a pipe section, which comprises:
   a. a housing adapted to be mounted around said threaded end,
   b. a generally cylindrical bladder interposed concentrically between said housing and said threaded end,
   c. means to define a sealed chamber at least a portion of which is located radially-outwardly of said bladder and radially-inwardly of said housing,
      said means including surface means provided on said housing at a region thereof remote from the extreme end of said pipe section,
      said surface means converging toward the extreme end of said pipe section, said sealing means further comprising a sealing lip interposed between said converging surface means and an outer wall of said housing, and being adapted to engage said surface means and maintain sealing contact therewith despite changes in the axial position of said bladder relative to said housing,
      said surface means and said lip further cooperating to maintain said housing mounted on said bladder, and
   d. means to pass fluid under pressure into said chamber to thus force said bladder radially-inwardly into tight gripping relationship to said threaded end of said pipe section, and to maintain said pressure whereby to maintain said bladder and thus said housing effectively in position on said threaded end to thereby protect the same.

17. The invention as claimed in claim 16, in which said lip of said bladder has a surface which converges downwardly generally correspondingly to the downward convergence of said surface means, and has a sealing bead at the portion thereof farthest from the axis of said pipe section and farthest from the extreme end of said pipe section.

18. The invention as claimed in claim 16, in which means are provided to bias said sealing lip into engagement with said surface means prior to said introduction of fluid pressure into said chamber.

19. The invention as claimed in claim 18, in which said bias means comprises protuberances molded into said bladder.

20. The invention as claimed in claim 16, in which said bladder is formed of rubber.

21. A fluid operated thread protector for the threaded end of a pipe section, which comprises:
 a. a housing having a portion adapted to be disposed at the threaded end of a pipe section,
 b. bladder means mounted adjacent said threaded end, said bladder means having a lip disposed adjacent said portion of said housing,
  said lip having molded therein a ring which prevents changing of the diameter of said lip despite the presence of high fluid pressures adjacent said bladder means, and
 c. means to introduce fluid pressure into said housing to effect forcing of said bladder means into tight gripping relationship with said threaded end portion of said pipe section.

22. The invention as claimed in claim 21, in which an O-ring is mounted in said housing portion and in engagement with said lip, said O-ring being present in an annular groove provided in said housing portion adjacent said lip.

23. The invention as claimed in claim 21, in which said ring is formed of metal.

24. A fluid operated thread protector adapted to grip tightly against both the exterior and interior surfaces of the threaded end of a pipe section, and to protect such end effectively against heavy blows and shocks, which comprises:
 a. a housing having a generally cylindrical outer portion, an inwardly-extending base portion, and a generally cylindrical inner portion,
  said outer and inner portions being coaxial and being radially spaced relative to each other sufficiently that when said pipe section is mounted coaxially therebetween there is a substantial radial space between said outer portion and the outer surface of said pipe section, and also between said inner portion and the inner surface of said pipe section,
 b. a thick-walled rubber bladder having a generally cylindrical outer portion interposed between said outer housing portion and said outer surface,
  said bladder also having a generally cylindrical inner portion interposed between said inner housing portion and said inner surface, said bladder also having a base portion sealingly connecting the lower edge regions of said outer and inner bladder portions,
   said base bladder portion being interposed between said base portion of said housing and the extreme end of said pipe section, said bladder thus being generally U-shaped, in axial section, at each side thereof,
 c. means to seal to said outer housing portion the lip of said outer bladder portion remote from said base bladder portion,
 d. means to seal to said inner housing portion the lip of said inner bladder portion remote from said base bladder portion, and
 e. means to inject gas into the spaces radially-inwardly of said inner bladder portion and radially-outwardly of said outer bladder portion to thus cause said bladder to grip tightly against said outer and inner surfaces of said pipe section,
  said gas, said bladder and said housing cooperating to effect a shock-absorbing and cushioning action relative to said threaded end.

25. The invention as claimed in claim 24, in which means are provided on said housing and extend radially-inwardly over said lip recited in clause (c), and means are provided on said inner housing portion and extend radially-outwardly over said lip recited in clause (d), thereby effectively maintaining said housing in mounted relationship on said bladder so that locking of said bladder onto said pipe section also effects locking of said housing onto said pipe section.

26. The invention as claimed in claim 24, in which said housing has a sheet steel shell forming said outer housing portion and said base housing portion, said shell having a nose ring mounted at the edge thereof remote from said base portion, and in which said inner portion of said housing is a generally cylindrical member the lower end of which is welded to the inner edge of said shell.

27. The invention as claimed in claim 26, in which the upper surface of said nose ring is beveled in a manner converging toward the axis of said pipe section and in a direction away from the extreme end of said pipe section.

28. The invention as claimed in claim 26, in which said shell is formed by the metal-spinning process, and is sufficiently thin that it will dent somewhat in response to extreme blows.

29. The invention as claimed in claim 24, in which said bladder incorporates means to effect flow of gas in either direction between said spaces radially-inwardly of said inner bladder portion and radially-outwardly of said outer bladder portion, and in which said means recited in clause (e) includes means to inject gas into said space radially-inwardly of said inner bladder portion.

30. The invention as claimed in claim 29, in which said means for passing gas between said spaces comprises grooves provided in the lower surface of said base portion of said bladder.

31. The invention as claimed in claim 24, in which said sealing means recited in clause (c) includes an interior circumferential surface provided on the portion of said housing remote from said base portion thereof, said circumferential surface converging toward the axis of said pipe and toward the extreme end of said pipe, and in which said lip recited in clause (c) is adapted to engage said convergent circumferential surface regardless of variations in the axial position of said outer bladder portion relative to said housing.

32. The invention as claimed in claim 31, in which means are provided at said base portion of said bladder to bias said lip recited in clause (c) toward said interior circumferential surface.

33. The invention as claimed in claim 32, in which said lastnamed means comprise a plurality of circumferentially-spaced protuberances formed on the bottom of said bladder base.

34. The invention as claimed in claim 24, in which said means recited in clause (d) comprises a substantially unstretchable ring molded into said lip of said inner bladder portion remote from said base bladder portion, the diameter of said ring being such that said lip has an inner diameter corresponding to the outer diameter of the adjacent region of said inner housing portion, regardless of the amount of pressure present in the apparatus.

35. The invention as claimed in claim 34, in which an O-ring is mounted in said inner portion of said housing adjacent said sealing lip of clause (d), said O-ring maintaining the seal between said sealing lip of clause (d) regardless of variations in axial position of said lip of clause (d) relative to said inner housing portion.

36. The invention as claimed in claim 35, in which a snap ring is mounted in an annular groove in said inner housing portion over said lip of clause (d), thus maintaining said bladder and housing in assembled relationship.

37. The invention as claimed in claim 24, in which said means recited in clause (d) comprises retaining means provided in said lip of said inner bladder portion remote from said base bladder portion, the diameter of said retaining means being such that said lip has an inner diameter corresponding to the outer diameter of the adjacent region of said inner housing portion regardless of the amount of pressure present in the apparatus.

38. The invention is claimed in claim 24, in which said means recited in clause (e) comprises a hollow tube extended transversely across said inner housing portion and communicating with ports therein, and valve means provided in said tube to inject gas into said tube and thus into said housing and thereafter, as desired by the operator, to bleed said gas from said housing through said tube, and in which said bladder base incorporate means to insure that the gas thus injected into said housing through said inner portion thereof may flow to and from the space between the outer portions of said bladder and housing.

* * * * *

UNITED STATES PATENT AND TRADEMARK OFFICE
CERTIFICATE OF CORRECTION

PATENT NO. : 4,036,261
DATED : July 19, 1977
INVENTOR(S) : Ernest D. Hauk, Thomas D. Hauk and Kenneth J. Carstensen It is certified that error appears in the above-identified patent and that said Letters Patent are hereby corrected as shown below:

Column 2, Line 18, please change "bed" to --bead--; Line 52, please change "addition" to --additional--.

Column 3, Line 42, please change "13" to --14--.

Column 9, Line 58, please change "said portion" to -- said second portion--.

Signed and Sealed this

Twenty-eighth Day of February 1978

[SEAL]

Attest:

RUTH C. MASON
Attesting Officer

LUTRELLE F. PARKER
Acting Commissioner of Patents and Trademarks